United States Patent Office 3,247,063
Patented Apr. 19, 1966

3,247,063
ANTICOAGULANTS CONTAINING HEPARIN
AND POLYSACCHARIDES
Robert Pulver, Binningen, near Basel, Switzerland, assignor to Geigy Chemical Corporation, Ardsley, N.Y., a corporation of Delaware
No Drawing. Filed Dec. 5, 1962, Ser. No. 242,380
Claims priority, application Switzerland, Dec. 8, 1961, 14,291/61
10 Claims. (Cl. 167—74)

The present invention concerns anticoagulants and their use for the reduction of the coagulability of the blood.

It has surprisingly been found that by combining heparin with a salt or complex salt of an acid polysulphuric acid ester of a polysaccharide, polyuronide or mucopolysaccharide or a modified polysaccharide, polyuronide or mucopolysaccharide, preparations are obtained the anticoagulant action of which in vitro and in vivo, i.e. on parenteral application as aqueous solutions to living organisms, is very considerably increased when compared with the action to be expected from the activity of the heparin therein and any activity of the second component. The salts or complex salts mentioned of acid polysulphuric acid esters, unmodified or modified polysaccharides, polyuronides or mucopolysaccharides, which are designated in this specification and the appended claims for the sake of brevity as "heparin-potentiating polysulphuric acid esters" are thus capable of potentiating the action of heparin.

The "heparin-potentiating polysulphuric acid esters" according to the invention are the alkali metal and alkaline earth metal salts, and the complex compounds thereof with calcium, of the sulphonation products of xylan, the dextrans, cellulose, pectin, the methyl glycosides of pectin, pectinic acid, the oxydatively, enzymatically and hydrolytically degraded pectins, chondroitin sulphuric acid, alginic acid and hyaluronic acid. They are obtained by sulphonation of the respective unmodified or modified polysaccharides, polyuronides or mucopolysaccharides in pyridine or formamide, according to methods of which that for the production of such polysulphuric acid esters from chondroitin sulphuric acid is described in Helv. chim. Acta 26, 1299 (1943), as well as in German Patent 870,094, that from pectin partially broken down by means of pectinase in German Patent 924,211, that from oxydatively degraded pectin in German Patent 1,056,113 which corresponds to U.S. Patent 2,901,474, and that from polygalacturonic acid methyl glycoside methyl ester in U.S. Patent 2,599,564 and that from pectinic acid in U.S. Patent 2,729,663.

In addition to those of the aforesaid "heparin-potentiating polysulphuric acid esters" which have themselves a considerable anticoagulant action, the term "heparin-potentiating polysulphuric acid esters" as used in this specification and the appended claims also comprises those of the above listed substances which, as a result of modification to smaller-molecular polysaccharides, polyuronides and mucopolysaccharides have themselves no noteworthy anticoagulant activity, but the advantage of being of only slight toxicity so that, in order to attain a suitable potentiation, they can be administered in higher dosages. On the other hand, also the polysulphuric acid esters falling under the aforesaid term of very high molecular weight and/or high sulphur content, which substances cannot themselves can be used as anticoagulant active substances, can be used in combinations according to the invention as, even in a relatively slight amount, such substances can potentiate the action of heparin and heparin, in turn, reduces their toxic effect.

To produce the anticoagulant preparations according to the invention, heparin (preferably heparin sodium, see Merck Index, 7th Ed. 1960, p. 511) is combined with at least the same to 50 times the amount of a "heparin-potentiating polysulphuric acid ester" as defined, i.e. an alkali metal or alkaline earth metal salt or a calcium complex salt, of an acid polysulphuric acid ester of an unmodified or a modified polysaccharide, polyuronide or mucopolysaccharide are mixed, either as dry substances or aqueous solutions, and if desired, the mixture obtained in the former case is dissolved in water. Aqueous solutions so obtained contain, in 100 parts by volume, 5 to 40 parts by weight of a combination of heparin and at least the same to 50 times the amount of a polysulphuric acid ester as defined.

Preferably the ratio of the mixture is from 1:4 to 1:19, for example 1:9; however, particularly with highly active polysulphuric acid esters, also smaller relative proportions and, with very well tolerated polysulphuric acid esters, also still higher relative proportions can be used in the combinations up to the limits given above.

Advantageously, such solutions are filled into, e.g. 2 or 5 ccm. ampoules or into greater dosage containers, e.g. of 10 ccm. and these are then sterilised. Dry ampoules can also be produced however, by filling with the dry mixture direct and then sterilizing.

The aqueous solutions according to the invention are administered parenterally to a living, warm blooded animal. Preferably 5–20% solutions are injected intravenously. Also up to 40% solutions can be injected either intramuscularly or, possibly, subcutaneously, to attain a depot action. Amounts of heparin mentioned in the above are given for standardised preparations having 100 international units (IE) per mg. It is advantageous to determine the amount of the polysulphuric acid ester as defined in international or usual manufacturing units also in order to compensate variations in effect of different additives. The polysulphuric acid esters which are mainly used, see Tables 1–6, have activities between about 5 and 50 international units per mg.

The amounts necessary of effective units per kg. body-weight necessary to reduce the coagulability of the blood are somewhat different depending on the warm blooded organism. A sufficient reduction of the coagulability of the blood to attain a prophylactic or therapeutic action in the treatment of thrombosis and embolism in human adults can generally be attained with dosages of the combination according to the invention of 25,000 to 200,000 international units per day. This dosage corresponds, for example, to 0.250–2.00 g. of a mixture consisting of 1 part of heparin and 9 parts of a polysulphuric acid ester as defined daily.

If desired, additives can be added to the aqueous solutions of the combinations according to the invention. In particular, such solutions can be mixed with the usual ointment bases to give them an ointment-like consistency. However, the pure components or mixtures thereof can be worked in direct into suitable aqueous ointment bases. Such ointments so obtained can be used for percutaneous local therapy or prophylactic treatment of thrombosis.

The high-molecular "heparin-potentiating polysulphuric acid esters" used in the combination according to the invention are produced, for example by reacting pectin in aqueous solution with hydrogen peroxide in a concentration of 1–5% and in an amount of 20–100%, calculated on the dry weight of the pectin, the reaction of the solution being neutral to weakly acid, until the desired degree of decomposition, which is determined by measuring the viscosity, is attained. The decomposition products are then precipitated, advantageously in fractions, by the addition of water soluble organic solvents, isolated, dried and then converted by means of chlorosulphonic acid in formamide or in pyridine, into acid polysulphuric acid esters. These latter, after neutralising with a non-precipitating base are reacted in aqueous solution while keeping the reaction in the region of neutral, with an ionising alkaline earth metal salt, in particular a calicum salt, and then, if desired, the alkaline earth metal complex compound is precipitated with a water soluble organic solvent.

The first step of the oxidative decomposition of pectin, in a process for preparing the novel coagulants, the reaction with hydrogen peroxide, is performed advantageously in the presence of at least 1% of an organic substance, calculated on the whole aqueous reaction solution, which is soluble at least in this concentration in water as well as in diethyl ether and has pectin precipitating properties in higher concentrations insofar as these are attainable in water, or it is performed in the presence of mixtures of such substances.

Advantageously 2–10% aqueous solutions of pectin are used. The reaction temperature can be between 25° and 100° C. and, if pressure vessels are used, can be still higher, but the moderately high temperatures between 50 and 80° C. have proved to be particularly favourable. By neutral to weakly acid reaction, in particular pH values of 5–6 are meant; what is important is that during the decomposition, the pH value should not sink considerably below 5. This can be prevented for example by buffering with sodium acetate. The decomposition reaction can last from some minutes to some days depending on the temperature used and the other reaction conditions. It is performed advantageously up to a relative viscosity of 1.3–3.0 centipoise at 75° C. and 5% concentration.

Pectin decomposition useful in the compositions according to the present invention, which on sulphation and subsequent formation of calcium complexes, produces highly active, non-toxic anticoagulants, having a molecular weight of preferably about 1000–3000, corresponding to 5–15 uronic acid units. If such decomposition products are reacted with sufficient amounts of salts of complex forming metals, e.g. with calcium salts, the molecular weight rises up to from 10 to 20 times the original, which can be explained by the union of up to 20 low molecular chains over the complex linkages. Similar increases in molecular weight, determined by decrease in the osmotic pressure, also occur on reacting the sulphation products according to the present invention with salts of complex forming metals. End products, i.e. calcium complexes of polysulphuric acid esters which have many times the molecular weight of the relatively low molecular starting products, are produced in this way from pectin decomposition products. By sulphation of pectin decomposition products of the same molecule size but which are produced in another manner, polysulphuric acid esters are obtained which, although they are non-toxic, do not have an action similar to heparin because of their lower molecular weight.

The oxidatively decomposed pectins can be sulphated analogously to the sulphation of pectin or of pectins partially decomposed by means of pectinase, for example with chlorosulphonic acid in formamide. According to this process, a mixture of chlorosulphonic acid and formamide is reacted at a temperature between 10° and 40° C. with the pectin decomposition product, optionally after this has been dissolved or suspended in formamide. Preferably, 2.5–5 parts by weight of chlorosulphonic acid and, in all, 6–14 parts by weight of formamide are used to 1 part by weight of pectin decomposition product. Esterification occurs to a considerable extent while some formamide is converted into ammonium salts, the reaction products being obtained directly with a sulphur content of 12% and more. They are isolated in a simple manner, e.g. by pouring the reaction mixture into alcohol and filtering off the precipitate. The acid polysulphuric acid esters obtained are neutralised by reacting them for example with caustic soda lye, sodium carbonate or sodium bicarbonate in aqueous solution.

Also the sulphation with chlorosulphonic acid in pyridine can be used which has already been described for polygalacturonic acid methyl glycosides and polygalacturonic acid methyl ester methyl glycosides.

The alkaline earth metal complex compounds can be produced from the polysulphuric acid esters for example by dissolving these in a concentration of 5–30% in water at room temperature, neutralising the solution with caustic soda lye and adding water soluble ionising alkaline earth metal salt, e.g. a calcium salt, such as calcium chloride, or a strontium salt, in a concentration of 0.5–10%. The complex forms very quickly and can be precipitated by the addition of e.g. methanol, ethanol or acetone. It is washed with the precipitating agent and dried. However, also sodium salts of the acid polysulphuric acid esters which have been isolated after sulphation can be dissolved in water and reacted with water-soluble calcium salts. If a non-pyrogenous solution of an ionising water-soluble calcium salt is used which is well tolerated by the patient, then, if desired, the calcium complex need not be isolated. In this case, the use of a small excess of polysulphuric acid ester is advantageous, i.e. the amount of calcium salt used should contain at least half up to about as many calcium ions as can be bound in all in the complex linkage by the polysulphuric acid ester. This is the case, for example, if about 24–40% of non-pyrogenous calcium gluconate, calculated on the sodium salt of the acid polysulphuric acid ester, are added in aqueous solution.

Because of the complex formation, the relatively low-molecular polygalacturonic acid methyl ester polysulphuric acid ester molecules form higher molecular, very active compounds, while any accompanying substances present remain low-molecular and are, therefore, non-toxic.

The following examples illustrate the production of the preparations according to the invention without limiting the scope of the invention thereto.

*Example 1*

1 g. of heparin sodium (100 IE/mg.) and 9 g. of calcium complex sodium salt of the polysulphuric acid ester of anoxidatively degraded pectin, prepared as described in U.S. Patent No. 2,901,474, are dissolved in distilled water ad 100 ccm. The solution is filled into ampoules each containing 2 or 5 ccm. or into containers containing 10 ccm. and these are then sterilised for 60 minutes in a current of steam.

In an analogous manner, for example, solutions with 0.5 g. of heparin sodium salt or an equivalent of heparin ammonium salt and 9.5 g. of the same polysulphuric acid ester or corresponding solutions with another polysulphuric acid ester, e.g. one of those mentioned in Tables 2–5 below, can be produced.

*Example 2*

An ointment containing 1% of active substance suitable for the local treatment or prevention of thrombosis is obtained by mixing an aqueous solution of 0.2 part of heparin sodium (100 IE/mg.) and 1.8 parts of the calcium complex sodium salt of a polysulphuric acid ester mentioned in Example 1 in 100.4 parts of water with the following additives:

0.2 part of p-chloro-m-cresol,
0.2 part of p-hydroxybenzoic acid methyl ester,
0.2 part of p-hydroxybenzoic acid isopropyl ester,
20.0 parts of glycerine,
12.0 parts of a polyethoxylated anhydrosorbitol monostearate ("Tween 60"),
1.0 part of sodium alginate,
34.0 parts of white soft paraffin (vaseline),
20.0 parts of stearyl alcohol,
10.0 parts of myristic acid isopropyl ester,
to form, in all, 200.0 parts of ointment.

Even in a ratio of heparin to the "heparin-potentiating polysulphuric acid esters" of 1:1, the potentiating action of the latter is very noticeable, and in general, it exceeds the additive activity the more, the larger the proportion of "heparin-potentiating polysulphuric acid ester" is in the combination. In combinations with polysulphuric acid esters having a longer half-life than heparin, in vivo, a longer action compared with pure heparin is achieved. I believe that, in accordance with the foregoing, this can be attributed to the stronger potentiation of the heparin moiety of the combination which is more quickly diminished in proportion to the polysulphuric acid ester moiety and this compensates for the reduction of the heparin blood level over a certain time.

That the polysulphuric acid esters as defined potentiate the action of heparin, can be demonstrated, for instance, in vivo or in vitro, by determining the dosages necessary for equal anticoagulant action both of the individual components and of combinations containing different proportions of the components and evaluating the results as follows: first, the weight ratio of equally effective dosages of pure heparin and pure polysulphuric acid ester are determined and, based on this ratio, the amount of heparin is calculated which has the same effect as the amount of polysulphuric acid present in a given combination with heparin. This amount of heparin is subtracted from the amount of pure heparin having an action equal to that of the combination, and in this way the theoretical amount of heparin is obtained which would have to be present in the combination if the action were purely additive. The ratio of the amount of heparin actually present in the combination to the theoretical amount of heparin mentioned above, gives the extent of the potentiation due to the combination of polysulphuric ester and heparin according to the invention.

The potentiation of the anticoagulant action of heparin by various polysulphuric acid esters can be seen, for example, from the following tests with human citrate blood wherein those concentrations in mg. percent (mg. substance in 100 ml. of total mixture) of pure components and combinations are determined and evaluated which are capable of increasing the recalcification time of human citrate blood to 24 minutes (normal time 6–8 minutes). The term "citrate blood" used in this specification means a mixture of 4 parts by volume of blood with 1 part of a 3.8% trisodium citrate solution, which mixture is prepared during the collection of the blood sample, for instance, by having the citrate solution present in the syringe. The recalcification time is determined by first mixing 1 ccm. of citrate blood with 0.5 ccm. of an aqueous solution of heparin or polysulphuric acid ester or with a combination thereof, the concentration of which corresponds to three times the total concentration of active substance give in the tables. After two minutes, 0.1 ccm. of a 3.7% calcium chloride solution is added and the lapse of time from this point until complete coagulation of the sample is measured. The same sample of citrate blood is used for all tests in the same series.

In the tables below the columns designated by numerals contain the following data:

Column 1.—He:Po=ratio of heparin (He) to polysulphuric acid ester (Po)

Column 2.—

$$\frac{He_{pure} - [He]_{Po}}{He_{real}} = \text{Potentiation}$$

$He_{pure}$: Concentration of pure heparin to attain a recalcification time of 24 minutes in mg. percent.

$[He]_{Po}$: He concentration which is equivalent to the Po concentration present in the mixture giving a recalcification time of 24 minutes in mg. percent.

$He_{real}$: Amount of He in the total concentration in mg. percent, which latter attains a recalcification time of 24 minutes.

TABLE 1

*Potentiation of heparin by a polysulphuric acid ester of oxidatively degraded pectin*

He: heparin-sodium (100 IE/mg.)
Po: sodium salt-calcium complex of polysulphuric acid ester of oxidatively degraded pectin (prepared as described in U.S. Patent No. 2,901,474)
$He_{pure}$: 0.45 mg. percent
The ratio of the pure components He and Po having the same action was found to be 0.45 mg. percent:4.0 mg. percent=1:8.9

| 1 He:Po | 2 Potentiation |
|---|---|
| 1:1 | 1.44 |
| 1:4 | 2.29 |
| 1:9 | 3.49 |
| 1:19 | 4.58 |
| 1:39 | 7.15 |

TABLE 2

*Potentiation of heparin by a xylan polysulphuric acid ester*

He: heparin-sodium (100 IE/mg.)
Xy: sodium salt of xylan polysulphuric acid ester commercially available under the trade name of Thrombocid
$He_{pure}$: 0.18 mg. percent
The ratio of the pure components He and Xy having the same action was found to be 0.18 mg. percent:1.44 mg. percent=1:8.0

| 1 He:Xy | 2 Potentiation |
|---|---|
| 1:1 | 1.16 |
| 1:4 | 2.15 |
| 1:9 | 3.27 |
| 1:19 | 5.52 |
| 1:39 | 8.0 |

TABLE 3

*Potentiation of heparin by a dextran polysulphuric acid ester*

He: heparin-sodium (100 IE/mg.)
De: sodium salt of dextran polysulphuric acid ester (see Ricketts, Biochem. J. 51, 129 (1952)
$He_{pure}$: 0.31 mg. percent
The ratio of the pure components He and De having the same action was found to be 0.31 mg. percent: 1.8 mg. percent=1:5.81

| 1 He:De | 2 Potentiation |
|---|---|
| 1:1 | 1.07 |
| 1:9 | 1.96 |
| 1:39 | 2.73 |

TABLE 4

*Potentiation of heparin by a pectin sulphuric acid ester*

He: heparin-sodium (100 IE/mg.)
Pe: sodium salt of the polysulphuric acid ester of a pectin partially degraded by means of pectinase, commercially available under the trade name of Thrombo-Stop
$He_{pure}$: 0.29 mg. percent The ratio of the pure components He and Pe having the same action was found to be 0.29 mg. percent:2.06 mg. percent=1:7.10

| 1<br>He:Pe | 2<br>Potentiation |
|---|---|
| 1:1 | 1.27 |
| 1:4 | 1.34 |
| 1:9 | 2.07 |
| 1:19 | 2.44 |
| 1:39 | 2.71 |

TABLE 5

*Potentiation of heparin by a chondroitin polysulphuric acid ester*

He: heparin-sodium (100 IE/mg.)
Ch: sodium salt of chondroitin polysulphuric acid ester commercially available under the trade name of Eleparon
$He_{pure}$: 0.365 mg. percent The ratio of the pure components He and Ch having the same action was found to be 0.365 mg. percent:2.92 mg. percent=1:8.0

| 1<br>He:Ch | 2<br>Potentiation |
|---|---|
| 1:1 | 1.70 |
| 1:4 | 2.59 |
| 1:9 | 3.20 |
| 1:39 | 3.27 |

TABLE 6

*Potentiation of the action of heparin in vivo*

Rabbits are used as test animals; aqueous solutions of the active substances to be tested in the dosages given in the tables are applied intravenously. Citrate blood was taken at the times given and the recalcification time thereof was measured. 4 rabbits were used for each dosage.

He=heparin-sodium (100 IE/mg.)
Po=calcium complex-sodium salt of polysulphuric acid ester of oxidatively degraded pectin (see Table 1)

| Dosage of active substance, mg./kg. | 1<br>He<br>1.0 | 2<br>Po<br>9.0 | 3<br>(He+Po)<br>(0.5+4.5) | 4<br>He+Po<br>(0.25+2.25) |
|---|---|---|---|---|
| | Recalcification time | | | |
| Blood taken: | | | | |
| After 0 mins | 4 | 5 | 4 | 5 |
| After 30 mins | 37 | 31 | 111 | 32 |
| After 60 mins | 5 | 8 | 18 | 6 |
| After 120 mins | 4 | 6 | 7 | 4 |
| After 180 mins | 3 | 4 | 5 | 3 |

It can be seen from the first two columns that 1 mg./kg. He and 9 mg./kg. Po have about the same action. Thus with a purely additive effect, the combination in the third column should also have about the same action, as the 4.5 mg./kg. Po and 0.5 mg./kg. He are about equivalent. In fact however, the action of this combination is about three times stronger than that of the individual dosages in columns 1 and 2. On analogously calculating the dosage on heparin, the dosage in the fourth column corresponds to 0.5 mg./kg., i.e. half that of column 1, whilst the action of the combination of column 4 is about the same as the action of the individual dosages in column 1.

That the polysulphuric acid ester Po potentiates the action of heparin can thus be clearly seen from the results in both columns 3 and 4.

I claim:

1. An anticoagulant preparation consisting essentially of heparin and at least the same to 50 times the amount of sodium salt-calcium complex of polysulphuric acid ester of oxidatively degraded pectin produced by reacting a 2 to 10%-aqueous solution of pectin with hydrogen peroxide in a concentration of 1 to 5% and in an amount of at least 20% and at most 100% calculated on the dry weight of the pectin, the reaction being performed at 25 to 100° C. at a pH of 5 to 6 until a degree of degradation corresponding to a relative viscosity of 1.3 to 3.0 centipoise has been attained.

2. An anticoagulant preparation consisting essentially of heparin and at least the same to 50 times the amount of sodium salt of xylan polysulphuric acid ester.

3. An anticoagulant preparation consisting essentially of heparin and at least the same to 50 times the amount of sodium salt of dextran polysulphuric acid ester.

4. An anticoagulant preparation consisting essentially of heparin and at least the same to 50 times the amount of sodium salt of pectinase-degraded polysulfuric acid ester of pectin.

5. An anticoagulant preparation consisting essentially of heparin and at least the same to 50 times the amount of sodium salt of chondroitin polysulphuric acid ester.

6. An anticoagulant composition consisting essentially of heparin and the same to 50 times the amount of a heparin-potentiating polysulphuric acid ester selected from the group consisting of the alkali metal and alkaline earth metal salts of xylan polysulphuric acid ester, dextran polysulphuric acid ester, cellulose polysulphuric acid ester, pectin polysulphuric acid ester, methyl glycoside of pectin polysulphuric acid ester, pectinic acid polysulphuric acid ester, chondroitin polysulphuric acid ester, alginic acid polysulphuric acid ester, hyaluronic acid polysulphuric acid ester, and the calcium complex compounds of said alkali metal salts.

7. An anticoagulant composition consisting essentially of an aqueous solution which, in 100 parts by volume, contains from 5 to 40 parts by weight of a combination of heparin and at least the same to 50 times the amount of a heparin-potentiating polysulphuric acid ester selected from the group consisting of the alkali metal and alkaline earth metal salts of xylan polysulphuric acid ester, dextran polysulphuric acid ester, cellulose polysulphuric acid ester, pectin polysulphuric acid ester, methyl glycoside of pectin polysulphuric acid ester, pectinic acid polysulphuric acid ester, chondroitin polysulphuric acid ester, alginic acid polysulphuric acid ester, hyaluronic acid polysulphuric acid ester, and the calcium complex compounds of said alkali metal salts.

8. A method for reducing the coagulability of the blood in a living, warm blooded animal comprising parenterally applying to the animal an effective amount of an aqueous solution which, in 100 parts by volume, contains 5 to 40 parts by weight of a combination of heparin and at least the same to 50 times the amount of a heparin-potentiating polysulphuric acid ester selected from the group consisting of the alkali metal and alkaline earth metal salts of xylan polysulphuric acid ester, dextran polysulphuric acid ester, cellulose polysulphuric acid ester, pectin polysulphuric acid ester, methyl glycoside of pectin polysulphuric acid ester, pectinic acid polysulphuric acid ester, chondroitin polysulphuric acid ester, alginic acid polysulphuric acid ester, hyaluronic acid polysulphuric acid ester, and the calcium complex compounds of said alkali metal salts.

9. An anticoagulant composition consisting essentially of heparin and at least the same to 50 times the amount of a member selected from the group consisting of the alkali metal and alkaline earth metal salts of pectinase-degraded polysulphuric acid ester of pectin and the calcium complex compounds of said alkali metal salts.

10. An anticoagulant composition consisting essentially of heparin and at least the same to 50 times the amount of a member selected from the group consisting of the alkali metal and alkaline earth metal salts of oxidatively degraded pectin produced by reacting a 2 to 10%-aqueous solution of pectin with hydrogen peroxide in a concentration of 1 to 5% and in an amount of at least 20% and at most 100% calculated on the dry weight of the pectin, the reaction being performed at 25 to 100° C. at a pH of 5 to 6 until a degree of degradation corresponding to a relative viscosity of 1.3 to 3.0 centipoise has been attained, then precipitating the decomposition products by the addition of a water soluble organic solvent, isolating and drying them and then converting the resulting products by means of chlorosulfonic acid in a reaction medium selected from the group consisting of formamide and pyridine to their acid polysulfuric acid esters, reacting the latter, after neutralization with a non-precipitating base in aqueous solution and while maintaining at least an almost neutral reaction, with an ionizing calcium salt.

References Cited by the Examiner

Jorpes: Heparin in the Treatment of Thrombosis, second edition, 1946, pages 48 to 53, Oxford University Press, N.Y., N.Y.

JULIAN S. LEVITT, *Primary Examiner.*

FRANK CACCIAPAGLIA, Jr., LEWIS GOTTS,
*Examiners.*